May 9, 1950 A. A. BEALS 2,506,698
BARBECUE AND GRILL
Filed Jan. 26, 1948 3 Sheets-Sheet 1

A. A. Beals INVENTOR
BY Snow & Co.
ATTORNEYS.

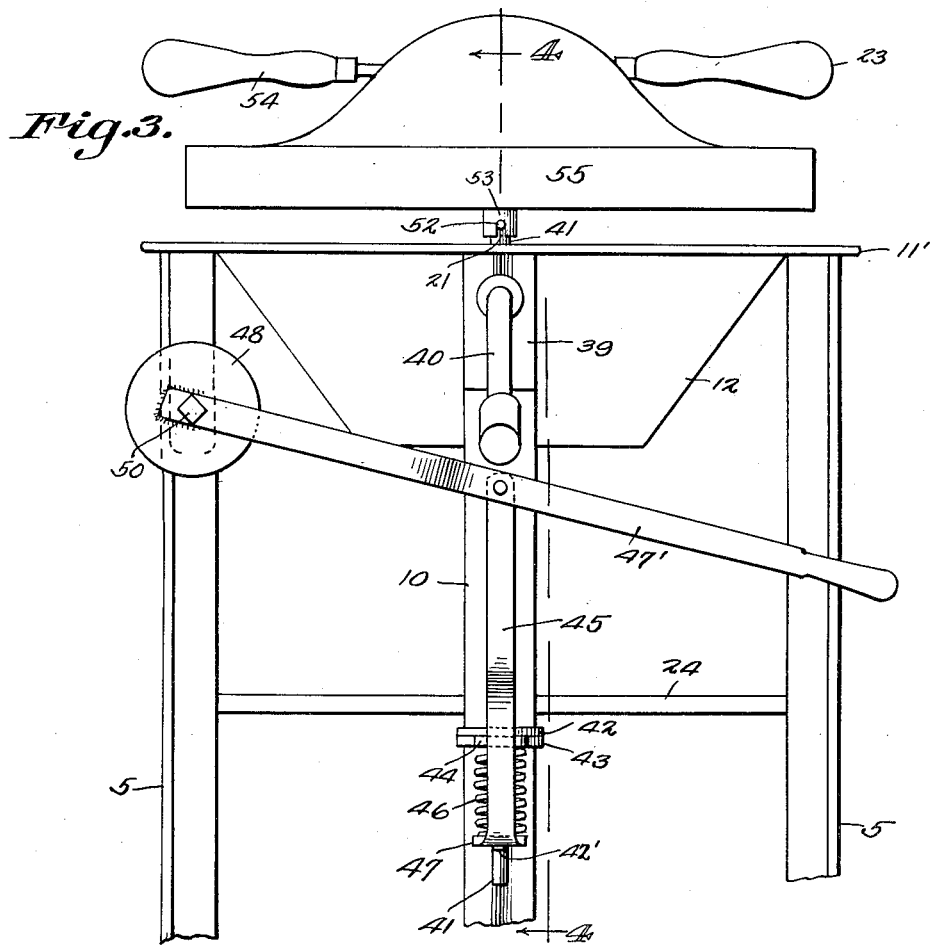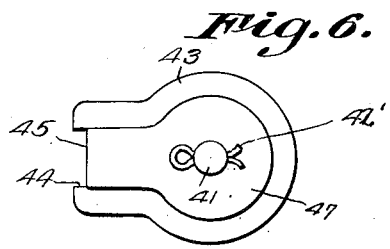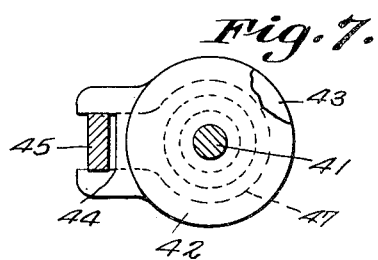

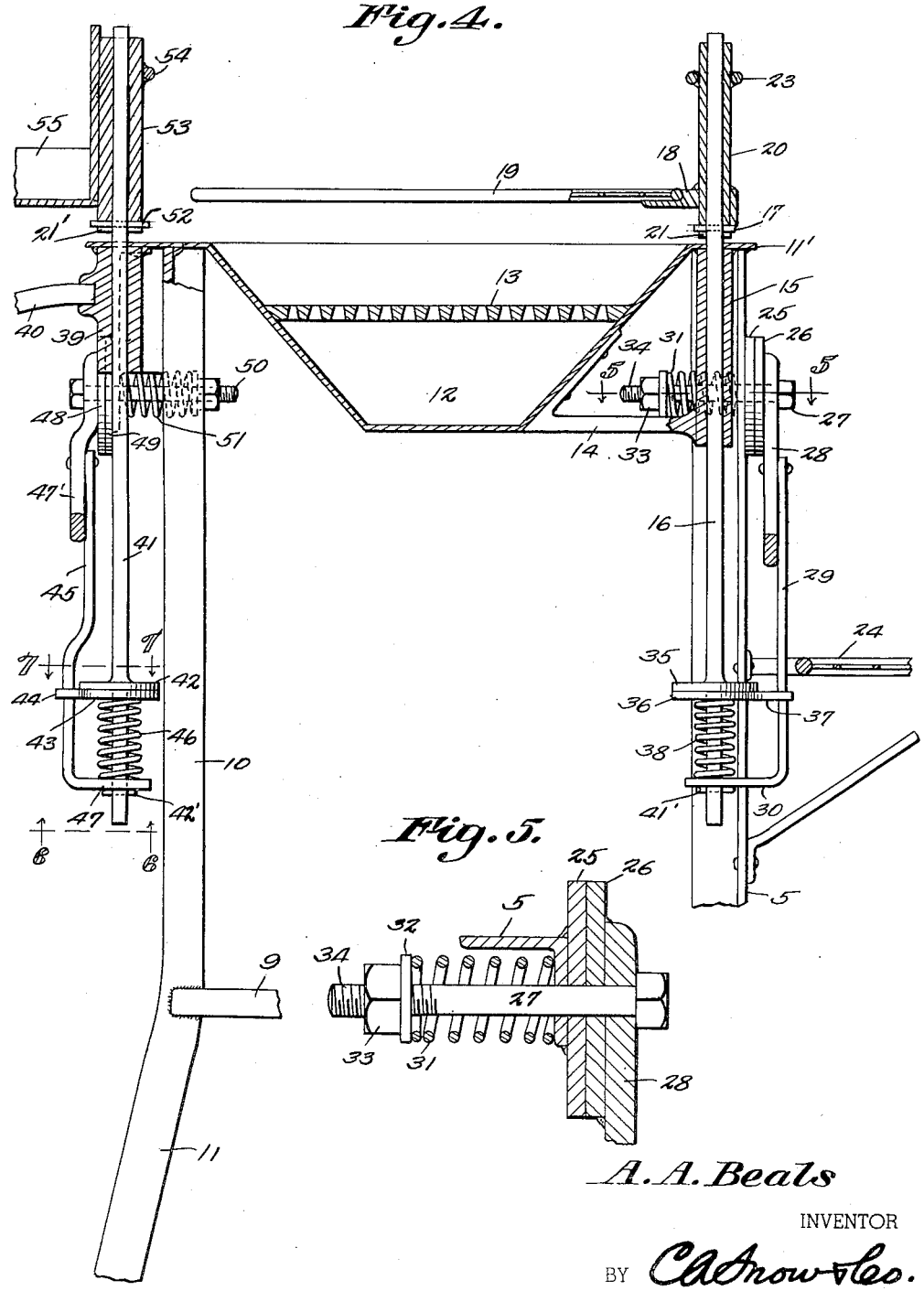

Patented May 9, 1950

2,506,698

UNITED STATES PATENT OFFICE 2,506,698

BARBECUE AND GRILL

Albert Allen Beals, Springfield, Mo.

Application January 26, 1948, Serial No. 4,389

2 Claims. (Cl. 126—25)

This invention relates to a barbecue and grill cooking unit of the charcoal burning type.

An important object of the invention is to provide a combined barbecue and grill cooking unit which is wheel supported so that it may be readily moved from place to place, to meet various requirements of use.

Another important object of the invention is to provide a device of this character including a pivoted frying pan and a pivoted grill, the frying pan and grill being so constructed that they may be readily moved to a position directly over the coals of the grill, for cooking articles positioned or placed thereon.

Still another object of the invention is to provide means whereby the frying pan or grill may be moved vertically and retained in such vertical position, thereby regulating the heat of the grill or pan to insure the proper cooking of the material placed in the pan or on the grill.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Fig. 3 is a rear elevational view of the device.

Fig. 4 is a sectional view taken on line 4—4 of Fig. 3.

Fig. 5 is a sectional view taken on line 5—5 of Fig. 4.

Fig. 6 is a sectional view taken on line 6—6 of Fig. 4.

Fig. 7 is a sectional view taken on line 7—7 of Fig. 4.

Figure 1:
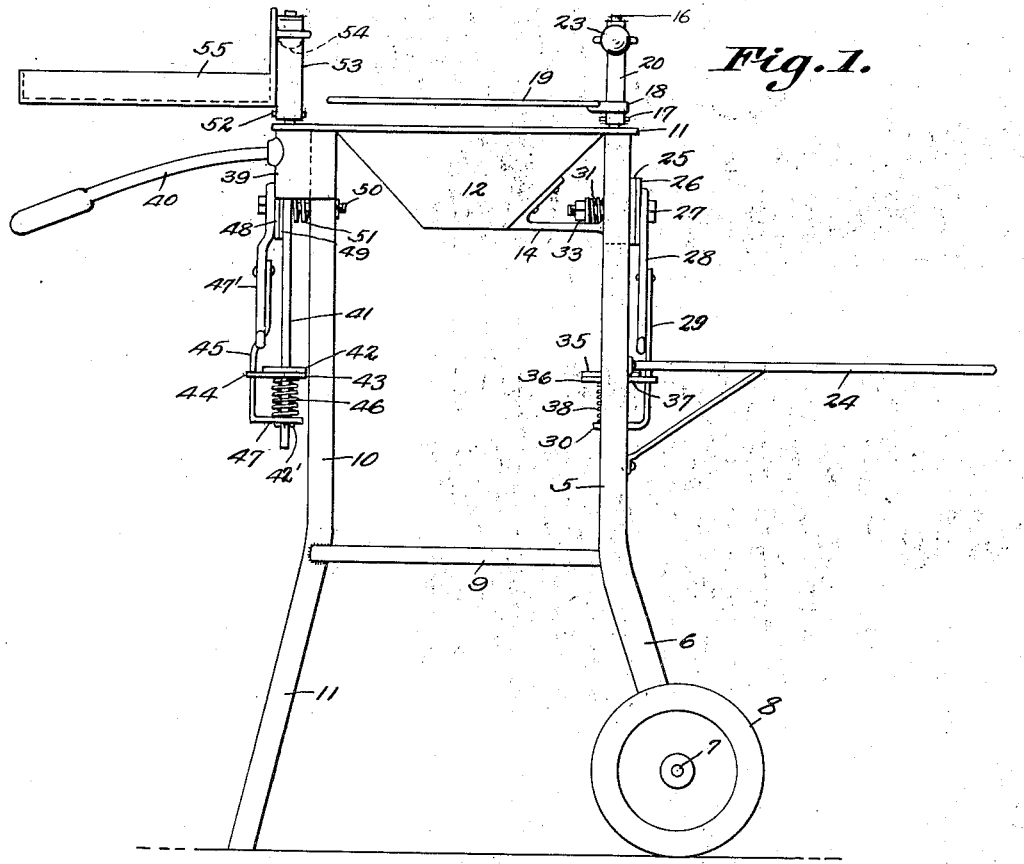
Figure 1 is a side elevational view of a portable grill, constructed in accordance with the invention.
Figure 2:
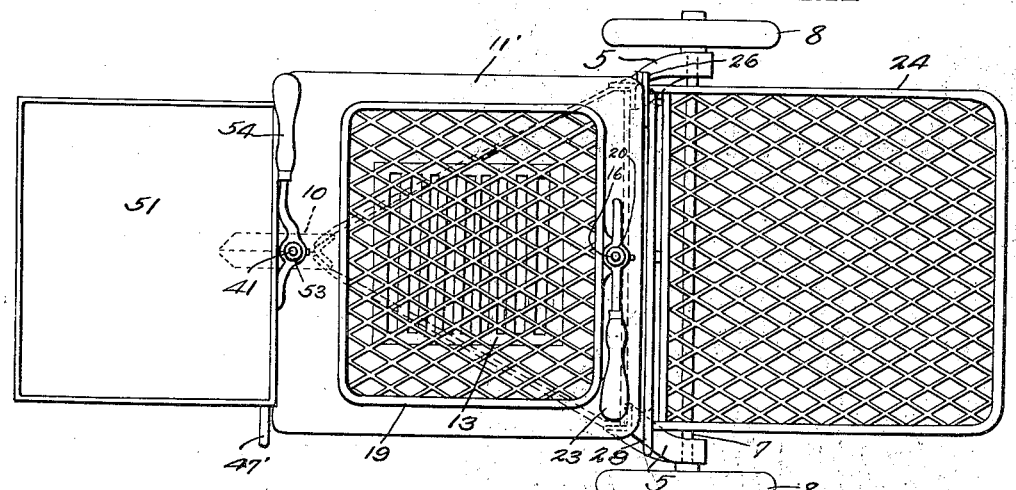
Fig. 2 is a plan view thereof.

Referring to the drawings in detail, the device comprises an upright frame embodying spaced front leg members 5, the lower ends thereof extending slightly forwardly as at 6 where they are provided with bearings for the axle 7 on which the wheels 8 are mounted, whereby the frame may be moved from place to place.

The frame also includes a lower triangular section 9 that fits within the leg members 5, which are constructed of angle bar material, as clearly shown by the drawings.

Connected with the lower triangular section 9, is a rear leg member 10 which leg member extends rearwardly as at 11, providing a support for the rear end of the portable grill.

The upper ends of the front leg members 5 and rear leg member 10, are connected by means of the rectangular frame 11' which is connected to the upper ends of the leg members by welding.

This frame 11' is provided with a well portion forming the fire box 12 in which the grate 13 is positioned, the grate providing the support for the fuel which in the present case may be charcoal briskettes, or lumps of charcoal.

The reference character 14 indicates a bracket which is secured to the front side of the fire box 12, the bracket providing a support for the tubular bearing 15 that is secured to the rectangular frame 11, the tubular bearing being preferably formed integral with the bracket 14.

This tubular bearing 15 provides a support for the upper portion of the grill supporting rod 16 which is provided with the pin 17 that extends therethrough with the ends extended beyond the rod 16. A tubular bearing 20 is welded to the arm 18 and extends to a point adjacent to the upper end of the rod 16, the tubular bearing having the notch 21 formed in the lower end thereof that fits over the pin 17, holding the tubular bearing and grill 19, secured thereto against rotation on the rod 16. Secured to the upper end of the tubular member 20 is the operating handle 23 by means of which the tubular bearing 20 and grill may be lifted and rotated from a position as shown by Fig. 1 of the drawings, to a position outwardly, directly over the work table 24 that extends forwardly from the device and on which dishes or pans may be supported for the convenience of the operator.

As clearly shown by the drawings, one of the front leg members 5 is formed with an opening that aligns with the openings in the disks 25 and 26, in which openings the bolt 27 operates. Secured to the disk 26 and rotatable on the bolt 27, is the lever 28, the lever being connected with the arm 29 that has its lower end 30 extended inwardly.

Mounted on the bolt 27, is the coiled spring 31 that has one end thereof bearing against the leg 5 at one side of the device, the opposite end of the spring abutting the washer 32 held in position by means of the bolt 33 that is positioned on the threaded end 34 of the bolt. Thus it will be seen that due to this construction, the tension of the coiled spring 31 may be regulated to increase or decrease the pressure between the contacting faces of the disks 25 and 26, thereby providing a clutch of the friction type to restrict movement of the lever and grill operated thereby. This lever 28 is of a length to extend to a point adjacent to the opposite front leg of the device on which the lever is pivoted.

The grill supporting rod 16 is formed with an annular flange 35 that rests on the disk 36 which has an outwardly extended lip 37 formed with a cut out portion for the reception of the arm 29, which moves vertically therein. Coiled spring 38 is disposed between the disk 36 and inturned end 30 of the arm 29, thereby providing a yieldable connection between the arm 29 and the lower end of the grill supporting rod 16. The cotter pin 41' extends through the rod 16 below the inturned end 30 holding the arm 29 on the rod 16.

From the foregoing it will be seen that due to this construction, when the lever 28 is operated vertically, the grill will be raised and lowered to meet various requirements. That is if the fire is exceptionally hot and has a tendency to burn the material resting on the grill and being cooked, it is only necessary to elevate the grill the frictional contact between the disks 25 and 26, acting to hold the lever in its adjusted positions.

Secured to the under surface of the rectangular frame 11 at a point adjacent to the rear thereof, is a depending bearing 39 to which the control arm or handle 40 is connected, whereby the device may be moved from place to place.

This tubular bearing 39 provides a support for the vertical rod 41 which carries the annular flange 42 at its lower end, which annular flange rests against the disk 43 and has a laterally extended lip 44 formed with a notch in which the arm 45 operates to prevent rotary movement of the rod 41, under normal conditions.

The coiled spring 46 rests on the inturned end 47 of the arm 45, while the upper end of the spring engages the disk 43 normally urging the disk into contact with the annular enlargement 42, setting up friction to retard rotary movement of the rod 41. The cotter pin 42' extends through the rod 41, below the inturned end 47 holding the arm 45 to the rod 41.

The operating lever 47' is secured to the friction disk 48 that bears against the friction disk 49, both disks 48 and 49 being mounted on the bolt 50 on which the coiled spring 51 is also mounted, the coiled spring acting to urge the disks 48 and 49 together providing a friction clutch to regulate movement of the lever 47' to hold the lever in its positions of adjustment.

Passing through the rod 41 with its ends extended beyond the sides of the rod 41 is the pin 52 which is received in the notch 21' formed on the lower end of the tubular bearing 53. Secured to the upper end of the bearing 53, is the handle 54 by means of which the frying pan 55 which is secured thereto, may be lifted and rotated from the position as shown by Fig. 1, of the drawings, to a position directly over the fire box to cook material positioned within the frying pan.

From the foregoing it will be seen that due to the construction shown and described, I have provided a barbecue and grill cooking unit, wherein a grill and frying pan are secured thereto, so that they may be readily rotated to a position directly above the grate 13 to cook articles positioned thereon. The grill may be rotated to a position remote from the fire box, and the frying pan rotated to take a position directly over the fire box for cooking purposes. It will also be seen that the grill or frying pan may be readily elevated or lifted from their supporting rods and the food cooked thereon served direct from the grill or frying pan.

By operating the levers 28 and 47', the grill and frying pan may be elevated and adjusted vertically with respect to the fire within the fire box, to meet various requirements of cooking.

Having thus described the invention, what is claimed is:

1. In a portable grill, a frame, a fire box mounted on the frame, a vertical grill supporting rod, a vertically movable arm secured to the frame and having a right-angled lower end formed with an opening in which one end of the grill supporting rod is secured, a disk through which the grill supporting rod extends, said disk being spaced above the right-angled end of the arm, an annular flange on the grill supporting rod, resting on the disk supporting said rod, an expansible coiled spring disposed between the right angled end of the rod and disk, normally urging the disk into frictional contact with the flange restricting rotary movement of the grill supporting rod with respect to the vertically movable arm, and a lever pivotally connected with the vertically movable arm for moving said arm, vertically adjusting the grill with respect to the fire box, and means for holding the grill in its positions of adjustment.

2. In a portable grill, a frame, a fire box mounted on the frame, a vertical grill supporting rod mounted at the side of the frame, a vertically movable arm having a right-angled lower end formed with an opening in which the lower end of the grill supporting rod is secured, means for yieldably holding the grill supporting rod in its normal position with respect to the vertically movable arm, an operating lever connected with the vertically movable arm, means for connecting the operating lever to the frame of the grill, said operating lever operating to raise and lower the vertically movable arm and grill supporting rod, and means for holding the lever in various positions of adjustment whereby said grill is yieldably supported in spaced relation with the fire box.

ALBERT ALLEN BEALS.

REFERENCES CITED

The following references are of record in the file of this patent:

UNITED STATES PATENTS

| Number | Name | Date |
| --- | --- | --- |
| D. 116,964 | Robinson | Oct. 3, 1939 |
| D. 144,573 | Moore | Apr. 30, 1946 |
| 1,423,612 | Jewett | July 25, 1922 |
| 1,666,293 | Lorton | Apr. 17, 1928 |
| 2,162,636 | Peoples | June 13, 1939 |
| 2,325,828 | Betts | Aug. 3, 1943 |
| 2,365,390 | Burmeister | Dec. 19, 1944 |
| 2,386,815 | Rubenstein | Oct. 16, 1945 |